(12) United States Patent
Plutt et al.

(10) Patent No.: US 6,591,164 B1
(45) Date of Patent: Jul. 8, 2003

(54) LIBRARY FAILOVER METHOD USING HOT SPARE REDUNDANT PICKER MECHANISM

(75) Inventors: Daniel James Plutt, Superior, CO (US); Timothy C. Ostwald, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 28 days.

(21) Appl. No.: 10/015,430

(22) Filed: Dec. 13, 2001

(51) Int. Cl.[7] .............................................. G06F 19/00
(52) U.S. Cl. ....................... 700/245; 700/213; 700/214; 700/245; 700/246; 700/247; 700/248; 700/249; 700/251; 700/258; 700/259; 700/260; 700/261; 701/23; 702/105; 369/30.31; 414/273; 901/1; 901/8; 901/50
(58) Field of Search ................................ 700/248, 214, 700/225, 215, 259, 246, 247, 249, 258, 260, 261, 253, 251, 213; 702/105; 369/30.31, 30.41, 92, 30.34, 30.28; 701/23, 30; 711/111–114; 414/273, 275; 901/1, 8, 50; 707/104.1

(56) References Cited

U.S. PATENT DOCUMENTS

| | | | | | |
|---|---|---|---|---|---|
| 6,304,798 | B1 | * | 10/2001 | Carpenter | .................... 700/258 |
| 6,327,519 | B1 | * | 12/2001 | Ostwald et al. | .............. 700/245 |
| 6,362,746 | B2 | * | 3/2002 | Ostwald | ..................... 340/683 |
| 6,393,335 | B1 | * | 5/2002 | Ostwald | ..................... 700/214 |
| 6,438,459 | B1 | * | 8/2002 | Dimitri et al. | ............... 700/255 |
| 6,445,651 | B1 | * | 9/2002 | Felde et al. | ............... 369/30.41 |
| 6,473,706 | B1 | * | 10/2002 | Gallo et al. | .................. 702/105 |
| 6,480,759 | B1 | * | 11/2002 | Ostwald et al. | ............. 700/245 |
| 6,487,474 | B1 | * | 11/2002 | Goodman et al. | .......... 700/245 |
| 6,493,604 | B1 | * | 12/2002 | Kappel et al. | .............. 700/213 |
| 6,512,963 | B1 | * | 1/2003 | Felde et al. | ................. 700/215 |
| 2002/0027742 | A1 | * | 3/2002 | Ostwald et al. | ................ 360/92 |
| 2003/0004609 | A1 | * | 1/2003 | Canaday et al. | ............ 700/245 |

OTHER PUBLICATIONS

ADIC, Automated mixed media library, 2000, Internet, pp. 1–6.*

\* cited by examiner

Primary Examiner—William A. Cuchlinski, Jr.
Assistant Examiner—McDieunel Marc
(74) Attorney, Agent, or Firm—Carstens, Yee & Cahoon, L.L.P.

(57) ABSTRACT

A "hot spare" method for facilitating the seamless transition from a failed robotic mechanism to backup unit is provided. A spare robot is located inside a storage library on a section of rail (robotic track) from which it can be utilized on any rail layer in a multi-layer architecture. In one embodiment of the present invention, a motorized elevator assembly is used to transport the spare robot to the proper library level, which allows a single redundant robot to support multiple robots on multiple library rail levels. In another embodiment, a hot spare robot is used on each rail level and is utilized if needed on that particular level. In both embodiments, the spare robots are available for immediate backup without direct user intervention.

18 Claims, 7 Drawing Sheets

LIBRARY FAILOVER METHOD USING HOT SPARE REDUNDANT PICKER MECHANISM

BACKGROUND OF THE INVENTION

1. Field of the Invention

The present invention relates generally to robotic media storage library systems, and more specifically to a redundant system that includes a plurality of independent robots in the form of robotic pods.

2. Background of the Invention

The current enterprise class library system contains multiple independent robots for concurrently manipulating multiple media cartridges. The library system comprises an array of media storage cells and media cartridge players. A system of rails is used to guide robotic pods through al of the locations on the array.

The current enterprise class library has a few redundant features, such as redundant robots and the robot servo controllers. However, there are still many potential single points of failure in the robotics electrical components (i.e. main controller, interrupt controller, etc.). If a failure occurs in one of these components, it may make the unit non-operational. Currently, there is a customer demand for high availability (99.999% run time) on enterprise class tape automated libraries, which requires minimum system down time due to individual component failures.

Library systems with two or more redundant robots have been implemented in the marketplace. However, adding redundant robots increases the complexity of managing spare robots among different library sections. This problem is compounded when additional layers of redundancy are used to handle multiple system failures.

Therefore it would be desirable to have a method for providing seamless transition from failed robotics to backup robotics within a data storage library, without the need for user intervention.

SUMMARY OF THE INVENTION

The present invention provides a "hot spare" method for facilitating the seamless transition from a failed robotic mechanism to backup unit. A spare robot is located inside a storage library on a section of rail (robotic track) from which it can be utilized on any rail layer in a multi-layer architecture. In one embodiment of the present invention, a motorized elevator assembly is used to transport the spare robot to the proper library level, which allows a single redundant robot to support multiple robots on multiple library rail levels. In another embodiment, a hot spare robot is used on each rail level and is utilized if needed on that particular level. In both embodiments, the spare robots are available for immediate backup without direct user intervention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
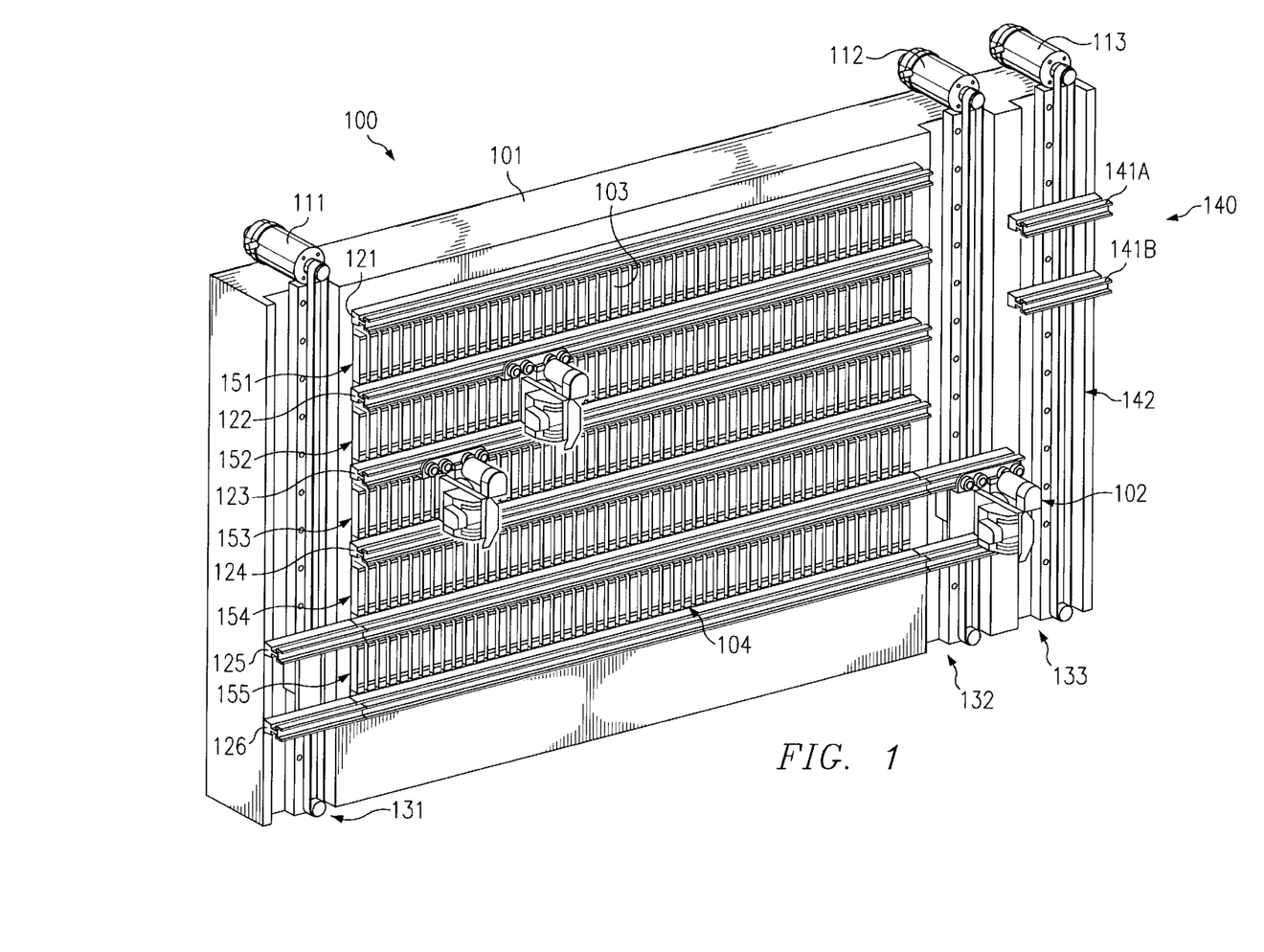
FIG. 1 depicts a perspective pictorial diagram illustrating the architecture of a single library storage module in accordance with the present invention.

The architecture of the present automated library system 100 is illustrated in FIG. 1 and contains the multiple independent robots 102 to enable the library system 100 to concurrently manipulate multiple media cartridges 105. The library system 100 comprises a two-dimensional array of media cartridge storage cells 103 and media cartridge players 104 that are mounted in a frame 101. A system of rails 121–126 is used to guide robotic pods 102 through all of the locations in the array, which eliminates the need for any steering or guide mechanisms on board the robotic pods 102, resulting in a reduction in the mass of the robotic pods 102. The rail system 121–126 also constrains the movement of the robotic pods 102 into horizontal and vertical movements, thereby simplifying the control algorithms for collision avoidance that are required by a typical random moveable object handling system based on horizontal, vertical and diagonal degrees of freedom. The robotic pods 102 contain a moveable carriage that is capable of transporting robotic components, such as media cartridge pickers, bar code reading devices, and other task oriented submodules, on the storage library rail system.

As shown in FIG. 1, the frame 101 is designed to receive a plurality of rows 151–154 of media cartridge storage cells 103, each of which is designed to house a single media cartridge 105. The media cartridge players 104 are shown in an arbitrary location in a horizontal row 155 at the bottom of the frame 101, although the library system 100 can incorporate media cartridge players 104 at any location in the frame 101 to optimize performance. The robotic pods 102 are attached to the frame 101 via horizontal guide rails 121–126, which serve to frame the media cartridge storage cells 103 and media cartridge players 104 on the top and bottom sides thereof. FIG. 1 shows an array of media storage cells 103 fully populated with media cartridges 105 of any arbitrary type. The robotic pod guide rails 121–126 provide support of the robotic pods 102 in the vertical direction to oppose the force of gravity, and they also provide a meshing surface of suitable design to impart traction in the horizontal direction for motive transport of the robotic pods 102. The robotic pods 102 each incorporate a drive means for propulsion in the horizontal direction along the guide rails 121.

FIG. 1 also shows a plurality of vertical elevator assemblies 131–133 that enable the transfer of the robotic pods 102 in the vertical direction. Multiple vertical elevator assemblies 131–133 are shown in FIG. 1 to exemplify the extensibility and redundancy of the invention. Each of the vertical elevator assemblies 131–133 comprise a set of vertical rails 142 that extend substantially from the top of the frame 101 to the bottom of the frame 101. The vertical rails 142 support a plurality of elevator stations 140, each of which contain short horizontal rail segments 141A, 141B that are identical in cross section to the main horizontal guide rails 121–126. The elevator stations 140 are held in suspension by a drive belt 143 which is made to wrap around a drive pulley attached to a vertical drive motor 113 that is located at the top of each elevator assembly 133. When a vertical displacement is required of any robotic pod 102, the vertical elevator 140 is scheduled to move in alignment to the appropriate level of rows 151–155 to allow transfer of the robotic pod 102 onto the elevator rail section 141A, 141B from the pair of horizontal rails 121–126 that are juxtaposed and abutting to the elevator rails 141A, 141B. Once the robotic pod 102 is located on the elevator station 140, the drive motor 113 is activated to transport the robotic pod 102 to a selected one of rows 151–155 and thence moves on to the pair of horizontal rails 121–126 that correspond to the selected row. Elevator assemblies 131–133 can carry more than one robotic pod 102 at a time by adding elevator platforms 140 to the elevator assemblies 131–133 or by extending the elevator platform length to accommodate multiple robotic pods 102 on a single elevator station 140.

Figure 2:
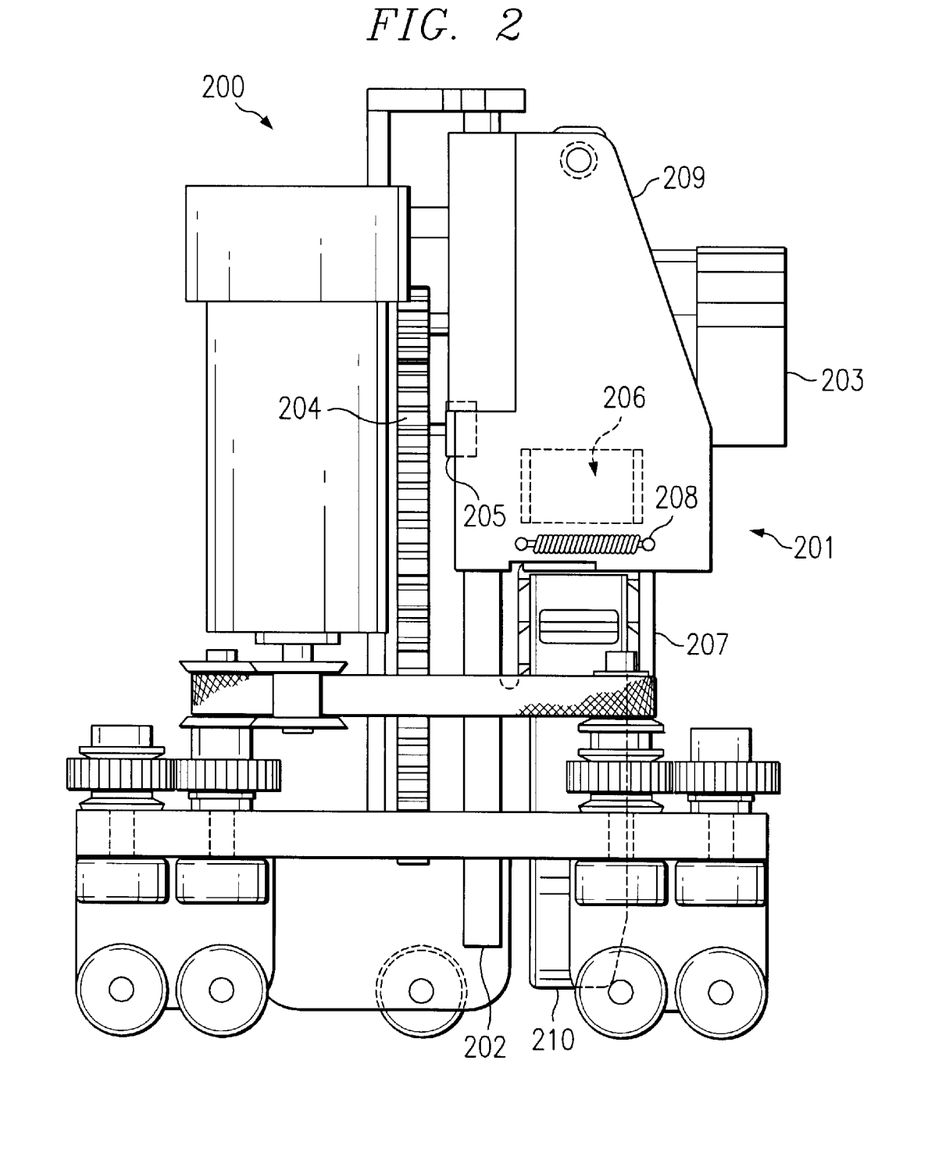
FIG. 2 depicts a pictorial diagram illustrating a robotic picker mechanism in accordance with the present invention.

Referring now to FIG. 2, a pictorial diagram illustrating a robotic picker mechanism is depicted in accordance with the present invention. A picker sub assembly mounted to a robotic pod base assembly allows for the picking and placing of media cartridges in media cartridge storage cells, media cartridge players and auxiliary slots such as library loading windows. The robotic pod 200 has a picker assembly 201 mounted on linear guide rails 202 and is extensible by means of a reach drive motor 203 and integral reach drive gear/crank 204 operating with a cam follower 205 arranged to impart linear motion to the gripper assembly 201. The picker assembly 201 is mounted on a gripper carriage 209 that slides on rails 202. The picker assembly 201 is actuated by an electromechanical solenoid 206 to open gripper fingers 207 against a spring force from springs 208. An alternate method (not shown) for gripping the media cartridge would be to provide a cam driven mechanical latching device to eliminate the solenoid 206, thereby reducing mass and complexity of the picker subassembly 201.

Figure 3A:
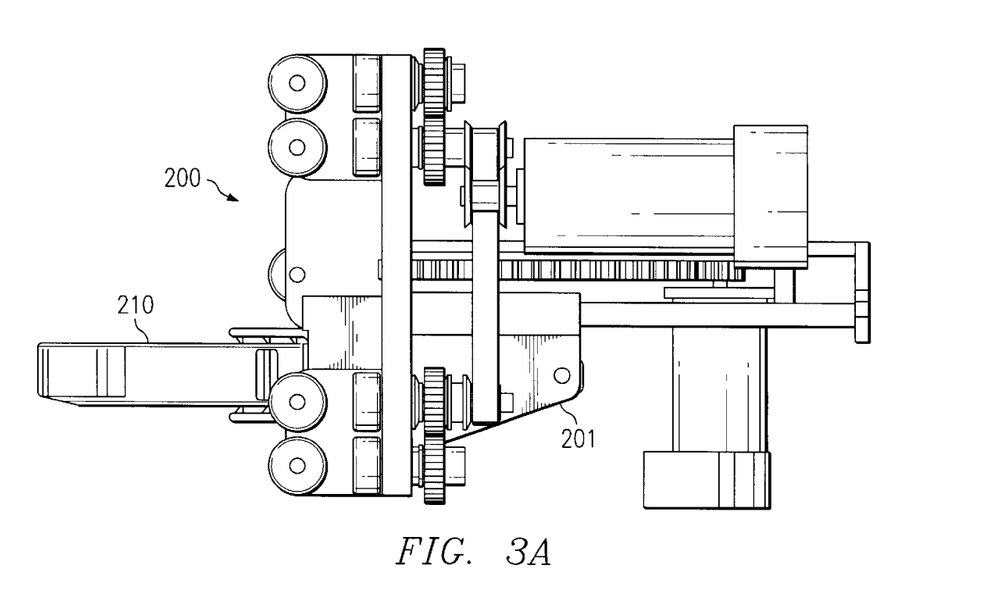
FIGS. 3A depicts a pictorial diagram illustrating a robotic picker mechanism holding a media cartridge in an extended position, in accordance with the present invention.
Figure 3B:
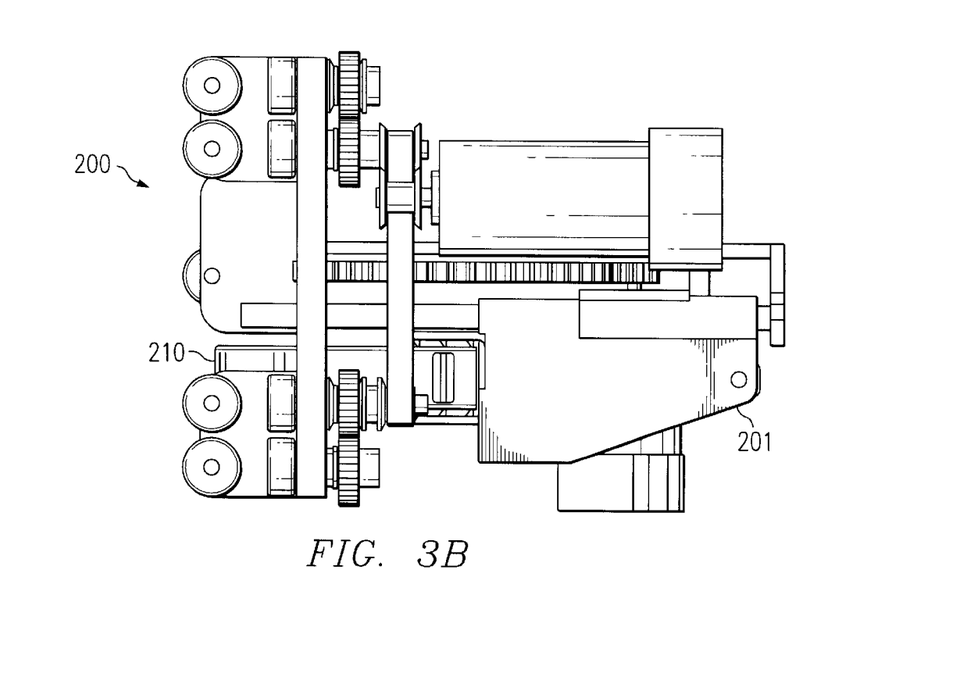
FIGS. 3B depicts a pictorial diagram illustrating a robotic picker mechanism holding a media cartridge in a retracted position, in accordance with the present invention.

Referring to FIGS. 3A and 3B, pictorial diagrams illustrating the operation of a robotic picker mechanism are depicted in accordance with the present invention. The picker assembly 201 is made to constrain the media cartridge 210 in an onboard position or an extended position. FIGS. 3A and 3B illustrate side views of the robotic pod 200 in the extended and retracted positions, respectively. Thus, the picker mechanism 201 grasps the media cartridge 210 and, when retracted, pulls the media cartridge into the robotic pod 200 to enable transportation of the selected media cartridge 210 to a designated location by the movement of the robotic pod 200.

Figure 4:
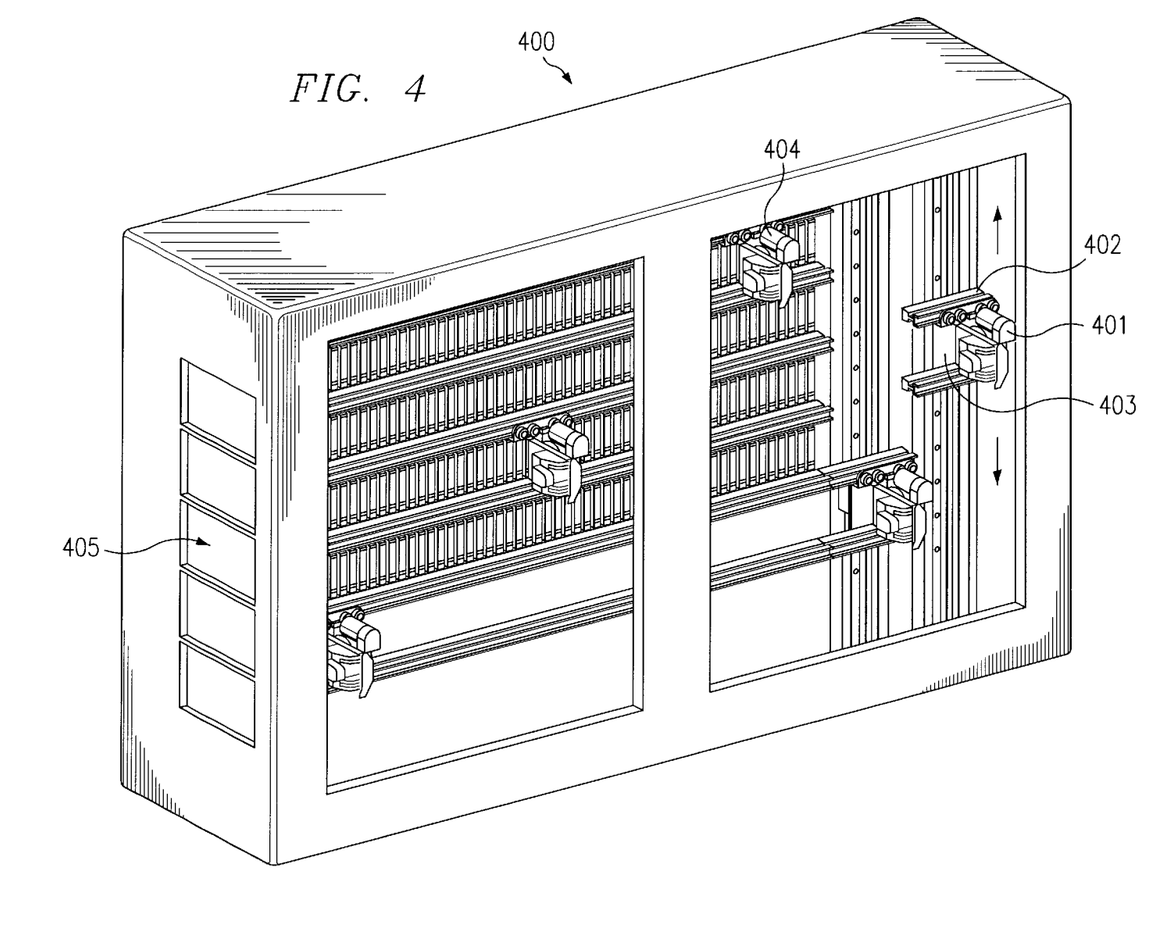
FIG. 4 depicts a pictorial diagram illustrating a storage library module with a roaming spare robot in accordance with the present invention.

Referring to FIG. 4, a pictorial diagram illustrating a storage library with a roaming spare robot is depicted in accordance with the present invention. The present invention uses a "hot spare" method to provide seamless transition from failed robotics to redundant backup units. A roaming spare robot 401 is located inside the library 400 on a section of rail (robot track) 402 from which it can be utilized on any rail layer within the multi-layer architecture. In one embodiment, a motorized elevator assembly 403 is used to transport the spare robot to the proper library rail level, which allows a single redundant robot to support multiple primary robots (e.g., robot 404) on multiple rail levels, reducing costs. Service doors 405 may be placed at both ends of the library unit to allow for the repair, installation, and removal of robot.

Figure 5:
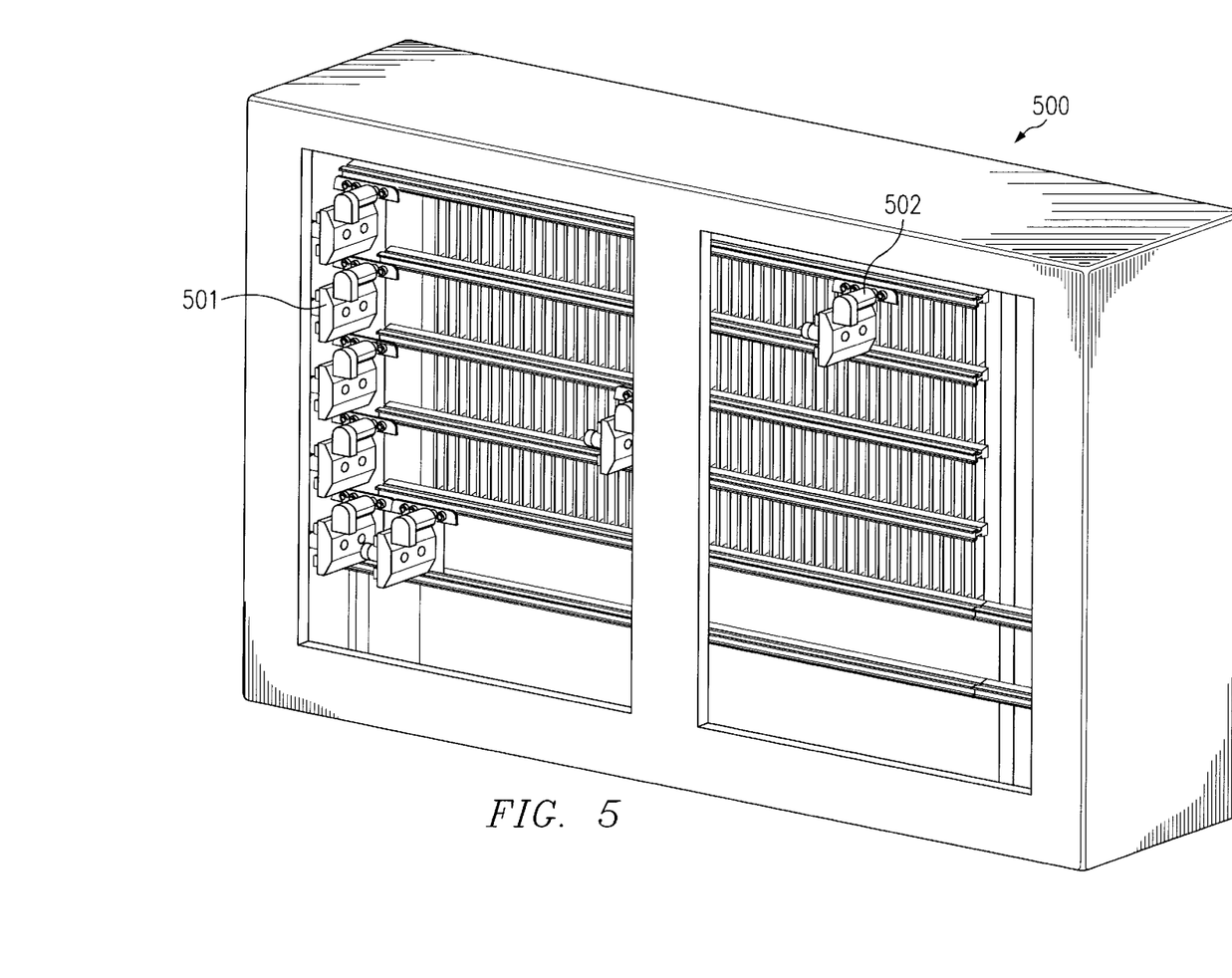
FIG. 5 depicts a pictorial diagram illustrating a storage library with multiple spare robots in accordance with the present invention.

Referring to FIG. 5, a pictorial diagram illustrating a storage library with multiple spare robots is depicted in accordance with the present invention. In this embodiment, a hot spare robot, e.g., 501, is positioned on each rail level and is used if needed to support a primary robot (e.g., robot 502) on that particular row.

In both embodiments depicted in FIGS. 4 and 5, the redundant robots are available without the need for direct user intervention.

Figure 6:
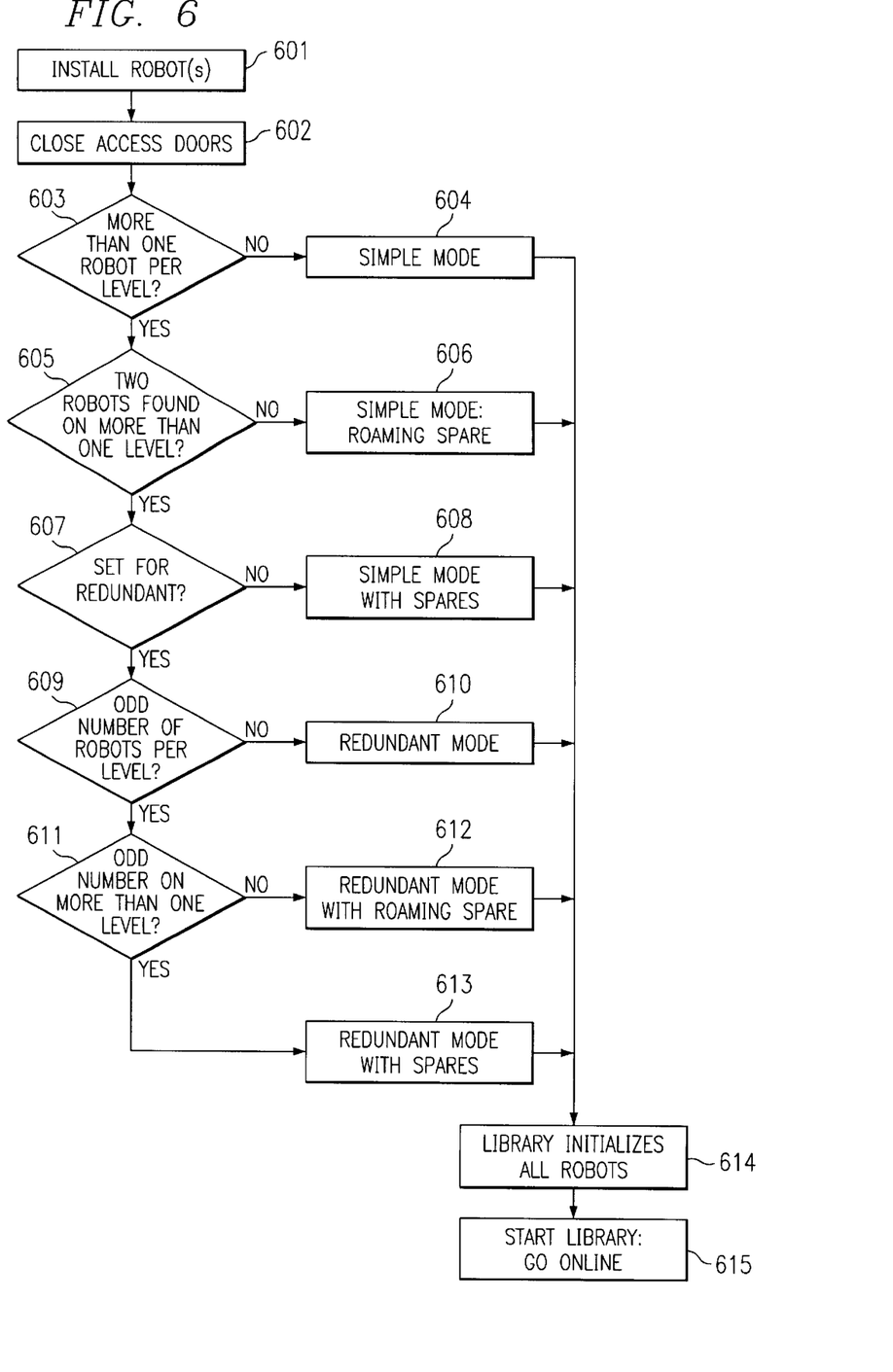
FIG. 6 depicts a flowchart illustrating the process of installing spare robot in an automatically configured library in accordance with the present invention.

Referring to FIG. 6, a flowchart illustrating the process of installing spare robot in an automatically configured library is depicted in accordance with the present invention. The process begins when robots are installed in a library system (step 601). The installation may be by means of the access doors, such as access door 405 in FIG. 4. The operator installing the robot(s) uses an operator panel to alert control software of the installation. The control software will prevent robot movement at the service area(s) where installation is occurring. After the robot is installed, the operator closes the access door, which signals to the control software that robot movement in the service area may resume (step 602). In the process illustrated in FIG. 6, the library automatically sets the mode of operation.

The library first determines if there is more than one robot per level (step 603). If there is only one robot per level, the library is set to simple mode, in which the control software directs a single robot on each row (step 604). If there is more than one robot on each level, the library system determines if there are two robots found on more than one level (step 605).

If only one level has two robots, the operations mode is set to simple mode with roaming spare, in which the control software directs one robot on each level and parks the spare robot at a predetermined standby location (step 606). The spare robot may move to any level in the library, depending on where it is needed.

If two robots are found on more than one level, the library determines is it has been preset to operate in redundant mode (step 607). If the library has not been preset to operate in redundant mode, it sets itself to simple mode with spares, in which the control software directs one robot on each level and parks a spare robot on the same level (step 608). If the library has been preset to operate in redundant mode, it must determine if there are an even or odd number of robots per level (step 609).

If the number of multiple robots per level is even (e.g., two), the operation mode is set to redundant, in which the control software directs two robots on each level (step 610). If there are an odd number of robots, the library assumes that the odd robot is to be used as a spare, and must then determine if there is an odd number of robots one more than one level (step 611).

If only one level has an odd number of multiple robots, the operation mode is set to redundant with roaming spare, in which the control software directs two robots on each level and parks the spare robot at a predetermined standby location (step 612). The spare robot may move to any level in the library, depending on where it is needed.

If an odd number of robots is found on multiple levels, the library sets the operation mode to redundant with spares, in which the control software directs two robots on each level and with spare robots parked at standby locations on each level (step 613).

After the library finishes setting the operations mode, it initializes all robots and installs software to calibrate mechanisms and audit library contents (step 614). The library then starts and comes online (step 615).

Figure 7:
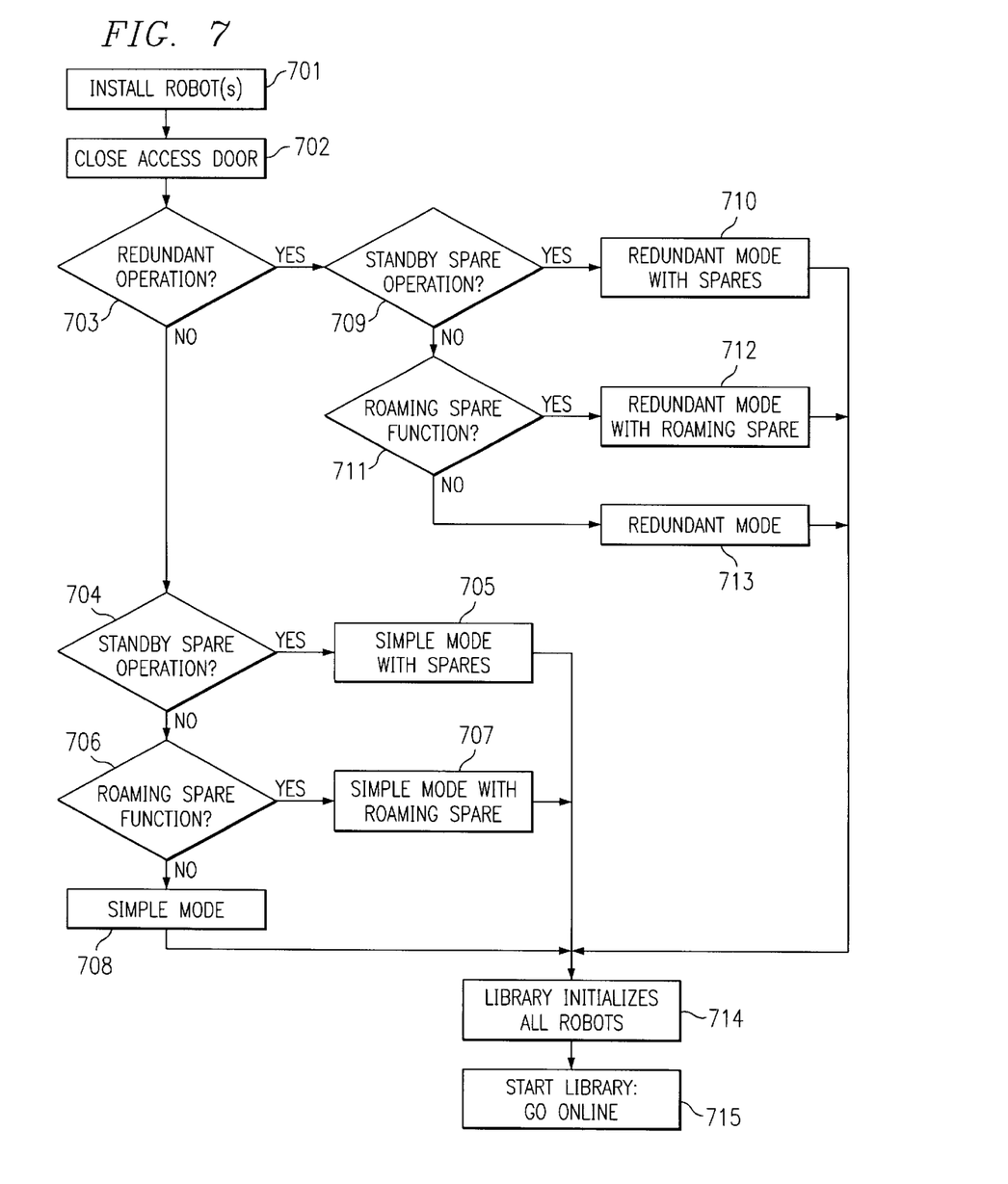
FIG. 7 depicts a flowchart illustrating the process of installing spare robot in a manually configured library in accordance with the present invention.

Referring to FIG. 7, a flowchart illustrating the process of installing spare robot in a manually configured library is depicted in accordance with the present invention. The process begins when robots are installed in a library system (step 701). In the installation may be by means of the access doors, such as access door 405 in FIG. 4. The operator installing the robot(s) uses an operator panel to alert control software of the installation. The control software will prevent robot movement at the service area(s) where installation is occurring. After the robot is installed, the operator closes the access door, which signals to the control software that robot movement in the service area may resume (step 702). In the process illustrated in FIG. 7, the operator manually sets the mode of operation by means of a service panel.

The first determination is whether the operator wants redundant operation for each library level (step 703). If the operator chooses to run the library in simple mode (without redundancy), the operator then decides whether to use standby spare operation (step 704). If standby spare operation is desired, the operator sets the operation mode to simple with spares, in which the control software directs one robot on each level, with a spare robot parked in a standby position on each level (step 705).

If the operator does not want to use standby spare operation, he then decides if he wants to employ a roaming spare robot (step 706). If the operator wants to use a roaming robot, the operation mode is set to simple with roaming spare, in which the control software directs a single robot on each level and parks a spare robot at a standby location (step 707). This roaming spare may then move to any library level where it is needed. If the operator does not want to use a roaming spare, the operation mode is set to simple, in which the control software directs only one robot per level (step 708).

Returning to step 703, if the operator wants redundant operation, he then determines if he wants standby spare operation for each level (step 709). If standby spare operation is desired, the operator sets the operation mode to redundant with spares, in which the control software directs two robots on each level with a spare robot parked at a standby location on each level (step 710).

If standby spare operation is not desired, the operator decides whether to use a roaming spare robot (step 711). If roaming spare operation is desired, the operator sets the operation mode for redundant with roaming spare, in which control software directs two robots on each level and parks a roaming spare robot at a standby location (step 712). The roaming spare robot may then move to any library level where it is needed.

If a roaming spare is not desired, the operator simply sets the operation mode to redundant, in which the control software directs two robots on each level (step 713).

After the operation mode has been set by the operator, the library initializes all robots and installs software to calibrate mechanisms and audit library contents (step 714). The library then starts and comes online (step 715).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for providing backup support for failed robotic mechanisms in a system comprising at east one robot on at least one rail, and at least one redundant robot that can move between multiple rails, the method comprising:

if a robot on any rail fails, automatically moving the redundant robot to the rail where the failed robot is located; and instructing the redundant robot to take over the functions of the failed robot.

2. The method according to claim 1, wherein the backup support is for a media storage library.

3. The method according to claim 1, wherein the at least one robot on at least one rail is a plurality of robots on a single rail.

4. The method according to claim 1, wherein the at least one robot on at least one rail is a plurality of robots on a plurality of rails.

5. The method according to claim 1, wherein the at least one redundant robot is a plurality of redundant robots.

6. The method according to claim 1, wherein the redundant robot performs tasks that are of lower priority than the tasks of the other robots, and wherein the lower priority tasks of the redundant robot are suspended if the redundant robot takes over the functions of a failed robot.

7. The method according to claim 1, wherein the redundant robot remains inactive as long as all other robots are functioning properly.

8. The method according to claim 1, wherein the redundant robot moves between rails by means of an elevator mechanism.

9. A system for providing backup support for failed robotic mechanisms in an apparatus comprising at east one robot on at least one rail, and at least one redundant robot that can move between multiple rails, the backup system comprising:

an error detection component which, if a robot on any rail fails, automatically moves the redundant robot to the rail where the failed robot is located; and an intervention component which instructs the redundant robot to take over the functions of the failed robot.

10. The system according to claim 9, wherein the backup support is for a media storage library.

11. The system according to claim 9, wherein the at least one robot on at least one rail is a plurality of robots on a single rail.

12. The system according to claim 9, wherein the at least one robot on at least one rail is a plurality of robots on a plurality of rails.

13. The system according to claim 9, wherein the at least one redundant robot is further comprising a plurality of redundant robots.

14. The system according to claim 9, wherein the redundant robot performs tasks that are of lower priority than the tasks of the other robots, and wherein the lower priority tasks of the redundant robot are suspended if the redundant robot takes over the functions of a failed robot.

15. The system according to claim 9, wherein the redundant robot remains inactive as long as all other robots are functioning properly.

16. The system according to claim 9, wherein the redundant robot moves between rails by means of an elevator mechanism.

17. A computer program product in a computer readable medium for use in a data processor, for providing backup support for failed robotic mechanisms in a system comprising at east one robot on at least one rail, and at least one redundant robot that can move between multiple rails, the computer program product comprising:

if a robot on any rail fails, instructions for automatically moving the redundant robot to the rail where the failed robot is located; and instructions for the redundant robot to take over the functions of the failed robot.

18. The computer program product according to claim 17, wherein the backup support is for a media storage library.

* * * * *